United States Patent [19]

Suzuki

[11] Patent Number: 4,760,608
[45] Date of Patent: Jul. 26, 1988

[54] IMAGE PROCESSING METHOD AND APPARATUS

[75] Inventor: Akira Suzuki, Kawasaki, Japan

[73] Assignee: Canon Kabushiki Kaisha, Tokyo, Japan

[21] Appl. No.: 96,809

[22] Filed: Sep. 10, 1987

Related U.S. Application Data

[63] Continuation of Ser. No. 366,076, Apr. 6, 1982, abandoned.

[30] Foreign Application Priority Data

Apr. 8, 1981 [JP] Japan ................................ 56-51856
Apr. 10, 1981 [JP] Japan ................................ 56-52960
Apr. 10, 1981 [JP] Japan ................................ 56-52961
Apr. 10, 1981 [JP] Japan ................................ 56-52962

[51] Int. Cl.[4] .......................... G06K 9/00; G06K 9/32; G03G 15/00
[52] U.S. Cl. ........................................ 382/61; 382/44; 355/3 R; 355/7; 355/14 C; 355/14 R; 358/256; 358/280
[58] Field of Search ........................... 355/7, 14 R, 40; 358/256, 280; 364/521, 523; 382/61, 48, 45, 44, 41

[56] References Cited

U.S. PATENT DOCUMENTS

| | | | |
|---|---|---|---|
| 3,214,574 | 10/1965 | Landsman et al. | 382/55 |
| 3,781,799 | 12/1973 | Robinson | 382/61 |
| 4,136,395 | 1/1979 | Kolpek et al. | 364/518 |
| 4,249,217 | 2/1981 | Korte et al. | 382/44 |
| 4,315,684 | 2/1982 | Sugiura et al. | 355/14 R |
| 4,324,484 | 4/1982 | Johnson | 355/14 R |
| 4,332,464 | 6/1982 | Bartulis et al. | 355/14 C |
| 4,404,683 | 9/1983 | Kobayashi et al. | 382/57 |
| 4,641,197 | 2/1987 | Miyagi | 358/280 |
| 4,702,589 | 10/1987 | Ito | 355/7 |

Primary Examiner—James J. Groody
Assistant Examiner—Michael D. Parker
Attorney, Agent, or Firm—Fitzpatrick, Cella, Harper & Scinto

[57] ABSTRACT

Image processing method and apparatus comprising the steps of input of image processing commands, storing in memory these commands in set in line with the sequence of a determined image processing and serially reading out the command set to carry out the image processing.

16 Claims, 15 Drawing Sheets

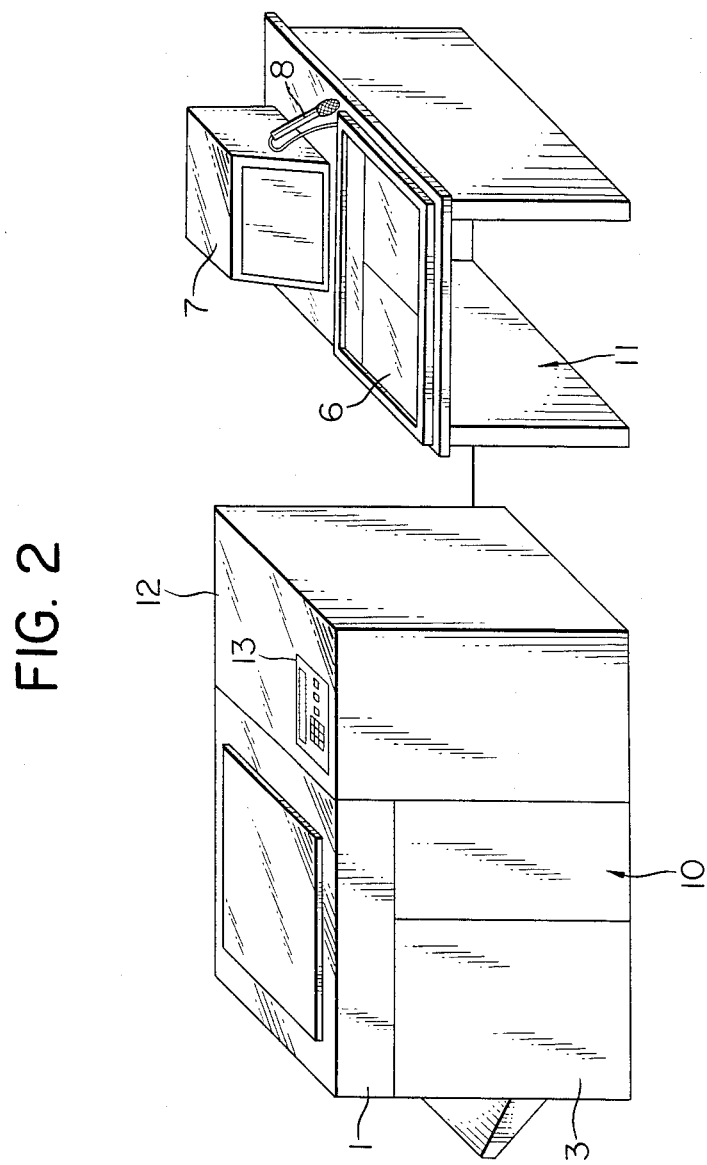

FIG. 4A  FIG. 4B  FIG. 4C
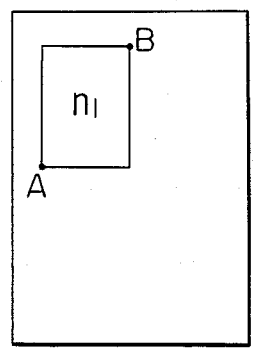
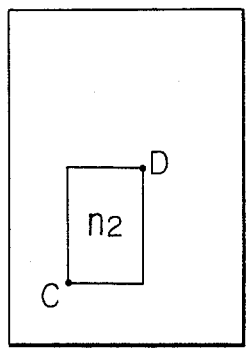
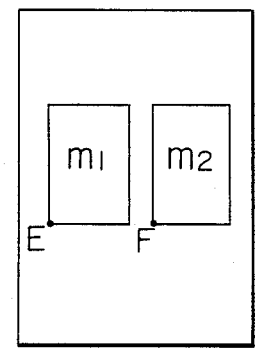
FIG. 5B
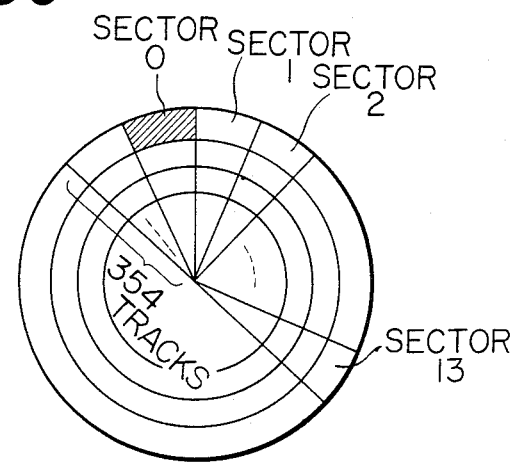
FIG. 5C

| | |
|---|---|
| STATUS | |
| MAX BLOCK | |
| I BLOCK SIZE | |
| CURRENT B No. | |
| (RSV) | |
| FILE No. | |
| FILE TYPE (O) | |
| (BANK) | |
| (RESERVED) | |
| BYTE COUNT | |
| SECTOR COUNT | |
| SEQUENCE No. | |
| DRIVE No. | |
| HEAD No. | |
| CYLINDER No. | |
| SECTOR No. | |
| STATUS 1 | |
| Xo | |
| Yo | |
| X1 | |
| Y1 | |

| |
|---|
| (RSV) |
| FILE No. |
| FILE TYPE (1,2) |
| BANK |
| ADDRESS |
| BYTE COUNT |
| SECTOR COUNT |
| SEQUENCE No. |
| DRIVE No. |
| HEAD No. |
| CYLINDER No. |
| SECTOR No. |
| STATUS 2 |
| RESERVED |

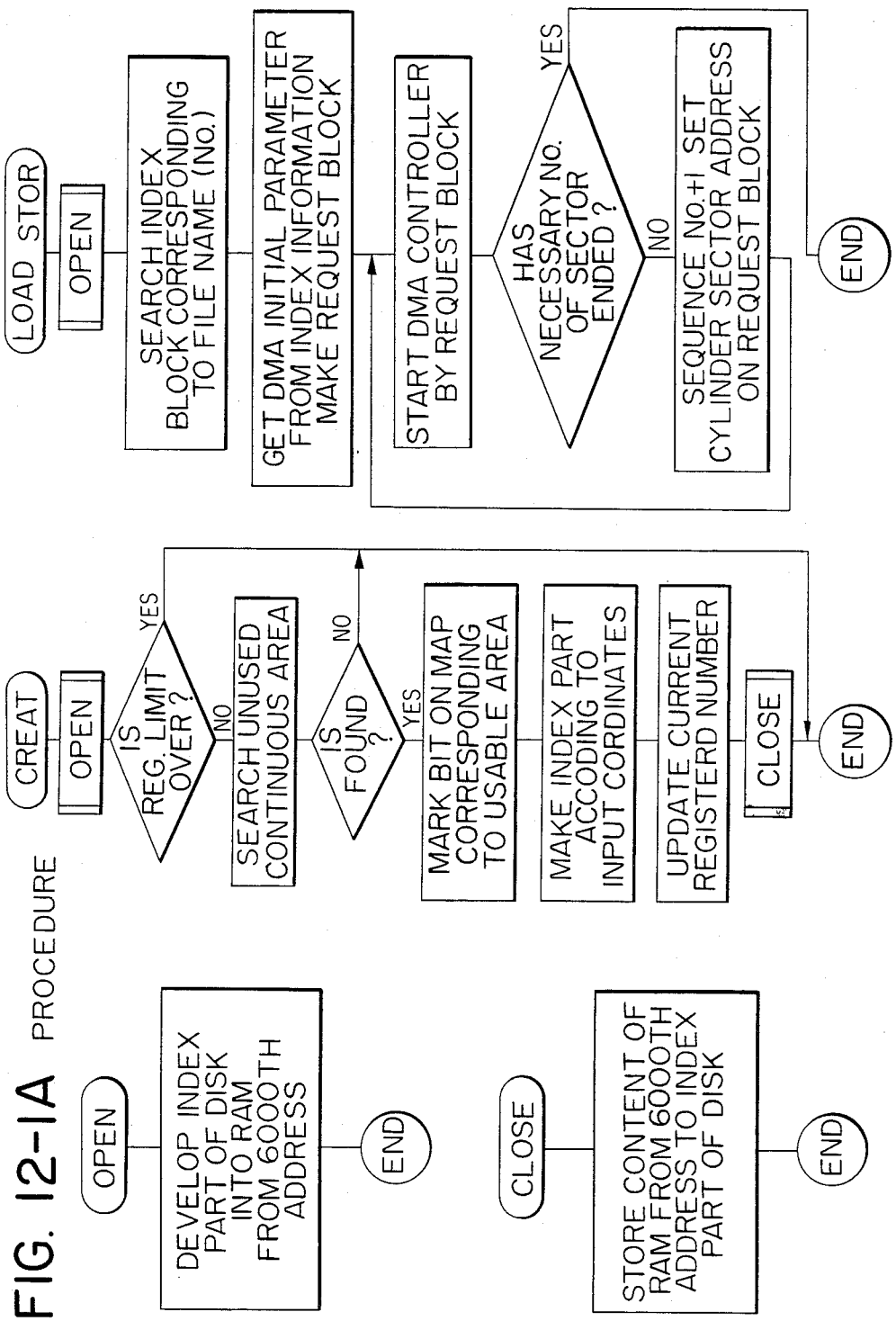
FIG. 12-1A PROCEDURE

IMAGE PROCESSING METHOD AND APPARATUS

This application is a continuation of application Ser. No. 366,076 filed Apr. 6, 1982, now abandoned.

BACKGROUND OF THE INVENTION

1. Field of the Invention

The present invention relates to method and apparatus for image processing such as image reproduction.

2. Description of the Prior Art

At present there are widely used copying machines to reproduce original images. However, the kinds of image processing which the conventional copying apparatus can perform are very limited. For example, the functions of such conventional copying apparatus are limited only to reproduce the same image as the original, to reproduce magnified or minified images of the original or to change the image density of the original. To broaden the image processing function of the apparatus, in these years, there have been proposed various image processing apparatus in which the original image is read as electric signals by use of CCD and the image data electric signals are electrically processed for various purposes. In addition to the above mentioned conventional functions, these image processing apparatus can perform many other functions, for example, to make a reproduction of a particular extracted part of the original, to make a composite image from two or more different images or to selectively change the image density of a selected part of the original.

According to the prior art, these image processing works are realized by preparing many corresponding commands for individual functions of the apparatus and serial input of the commands by the operator as required. This processing system of the prior art has some drawbacks. Among them, the command input troubles the operator very much. The reason for this is that even for routine jobs it is required to carry out the input of commands in the same combination every time the routine task is to be performed.

As an improvement in image processing there has been also proposed to store plural different sets of image data in a memory. This method is used in particular when only a part of an original is extracted and the image data contained in the extracted part is reproduced as desired. According to the improved method (cf. Japanese Patent Application Laid Open Patent Application No. 140,630/1978), each of plural different data sets stored in the memory contains a set of address data including the extracted image data, the number of picture elements thereof measured in the principal scanning direction and the number of lines measured in the secondary scanning direction.

However, this method also has the drawback that in image processing, it is very difficult to find out the reproduction coordinates of the extracted image data.

Further, in case of the prior art image processing apparatus, a problem arises when image data are to be stored in a disc memory. In this case, the image data should be stored sequentially in such sequence of track/sector address as to minimize the access time to the disc. The method for use of such disc volume conventionally employed is to divide the whole disc area into a plural number of sections by the maximum file length (whole picture area) and to allocate them to particular files. Although this method has solved the problem of access time, it has another disadvantage, viz. that the efficiency of utility of the memory area is reduced thereby.

As the memory for storing image data or command data there may be used also a dynamic RAM. However, the use of such dynamic RAM has a disadvantage that periodical refreshing work is required to prevent the content of the memory from being lost. If the original document is read by CCD or the like so as to register the image data in such memory, the timing of data registration and the timing of data refreshing sometimes bring about a problem in keep the data in memory.

On the other hand, various display methods have already been processed and used to externally display the statues of the system. For example, whenever it is required, the processing by CPU is stopped for a while and the content of the memory is read out from a certain memory address in which the status of the system has been stored by operating some hardware. Also, direct display employing LED's is often used. For example, an LED (light emitting diode) is connected to the output of a sensor detection amplifier to use it for direct display by means of hardware. Also, when CPU detects any abnormal state such as error, LED may be lighted on by CPU program.

These displays also have some drawbacks. For example, it is impossible to read out the memory content in dynamic state during the operation of the system. Further, the number of display devices required increases with the number of kinds of information which the operator wishes to obtain.

SUMMARY OF THE INVENTION

Accordingly, it is the general object of the present invention to eliminate the above mentioned drawbacks involved in the prior art.

More specifically, it is an object of the invention to provide an image processing method and apparatus with which the image processing works can be carried out with good operability and high processing efficiency.

It is another object of the invention to provide a processing method and apparatus of memory images having a higher reliability.

It is a further object of the invention to provide a system processing apparatus which enables the operator to watch the operational status of the system in a wide range and in real time.

It is a still further object of the invention to improve the conventional image processing method and apparatus using a disk as image memory.

Also, it is an object of the present invention to provide a method and apparatus for serially printing plural partial images on plural paper sheets.

According to the invention, the above objects are attained by the following features of the invention:

Routine tasks are previously stored in a disk in the form of a series of commands with file number affixed thereto. In executing any routine work or task, only the file number is put in to read out the corresponding file of commands in series from the disk. The routine work is executed while treating the content of the memory as a command for that work. In this manner, the operability and therefore the processing efficiency of the system are improved to a great extent.

Within the disk a certain fixed area is allocated to index data for file control. And there is provided means for reference and alteration of coordinate data registered in the index table of the corresponding image file. By doing so, a further improvement of image processing efficiency can be attained according to the invention.

In practice, the image data file is a variable length data and therefore it increases or diminishes in the course of operation of the system. In this course, according to the invention to eliminate the above drawback, reserving and cancelling of any sectors of the disk are correctly and suitably controlled with the minimum unit being one sector.

Further, according to the invention, the refreshing of the memory is carried out by means of serial pulses through the system controller.

According to another feature of the invention, the content of any address optionally selected among memories and input-output ports now in use are continuously displayed in the form of dynamic display at regular time intervals. This enables one to obtain such apparatus which makes it possible to watch the operations of the system in a wide range and in real time.

Other and further objects, features and advantages of the invention will appear more fully from the following description of preferred embodiments taken in connection with the accompanying drawings.

BRIEF DESCRIPTION OF THE DRAWINGS

FIGS. 4(A) to 4(C) illustrate an example of image processing;

FIG. 5(B) is a graphical representation of the sequence number of cylinder/head;

FIG. 5(C) is a plan view of the disk;

DESCRIPTION OF THE PREFERRED EMBODIMENTS

Figure 1:
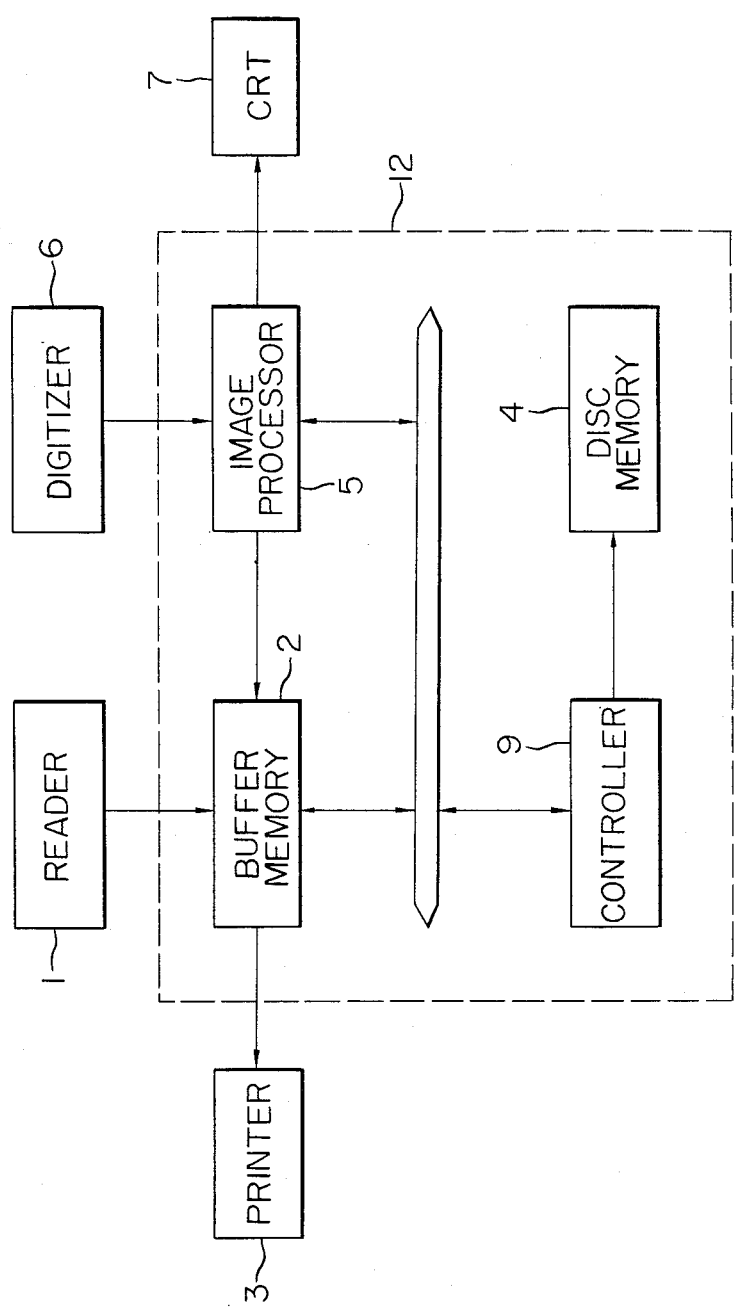
FIG. 1 is a block diagram showing the arrangement of an embodiment of the image processing method and apparatus according to the invention.

Referring first to FIG. 1 showing an embodiment of the present invention in block diagram, 1 is a reader part having a line sensor such as a CCD for reading the image of a document by means of photoelectric conversion. 2 is a buffer memory part constituted of semiconductor dynamic memories (D-RAM) for storing image data of the document serially put out from the reader part 1 as electric signals. The buffer memory 2 (hereinafter referred to also as "RAM") stores the image data in the amount of a sheet of document of predetermined size as one unit. 3 is a printer part composed of a laser printer for forming an image on a recording material such as paper in accordance with the image data stored in and serially issued out from the buffer memory. 4 is a magnetic disk memory for registering all or a part of the image data stored in the page memory 2. Transferring of the image data from the disk memory 4 to the buffer memory 2 is also possible. The disk memory 4 stores also other data necessary for image processing. 5 is an image processing part (CPU) for image processing of the output image data from the reader part 1, the stored image data in the buffer memory 2 and the registered image data in the disk memory 4. 6 is a digitizer by which the user can put in various data necessary for image processing such as command, coordinate, the number of prints required, etc. 7 is a CRT for displaying the processing data put in by the digitizer 6. The CRT makes it easy for the user to carry out input or correction of the processing data in the fashion of dialogue. 9 is a DMA controller for controlling DMA transfer of the image data. The buffer memory 2, disk memory 4 and image processing part (CPU) 5 together constitute an image processing control part 12.

As the CPU 5 there is used a microcomputer Model 8612 (or 8086+ROM) supplied by Intel Company. FIG. 2 is a perspective view of the embodiment.

In FIG. 2, the image processing unit generally designated by 10 is constituted of the above mentioned reader part 1, printer part 3 and image processing and controlling part 12 including buffer memory 2, disk memory 4 and image processor 5. Generally designated by 11 is an image processing data forming unit constituted by digitizer 6 and CRT 7. The two units 10 and 11 are formed as separate units and they are connected with each other through control lines.

Figure 3:
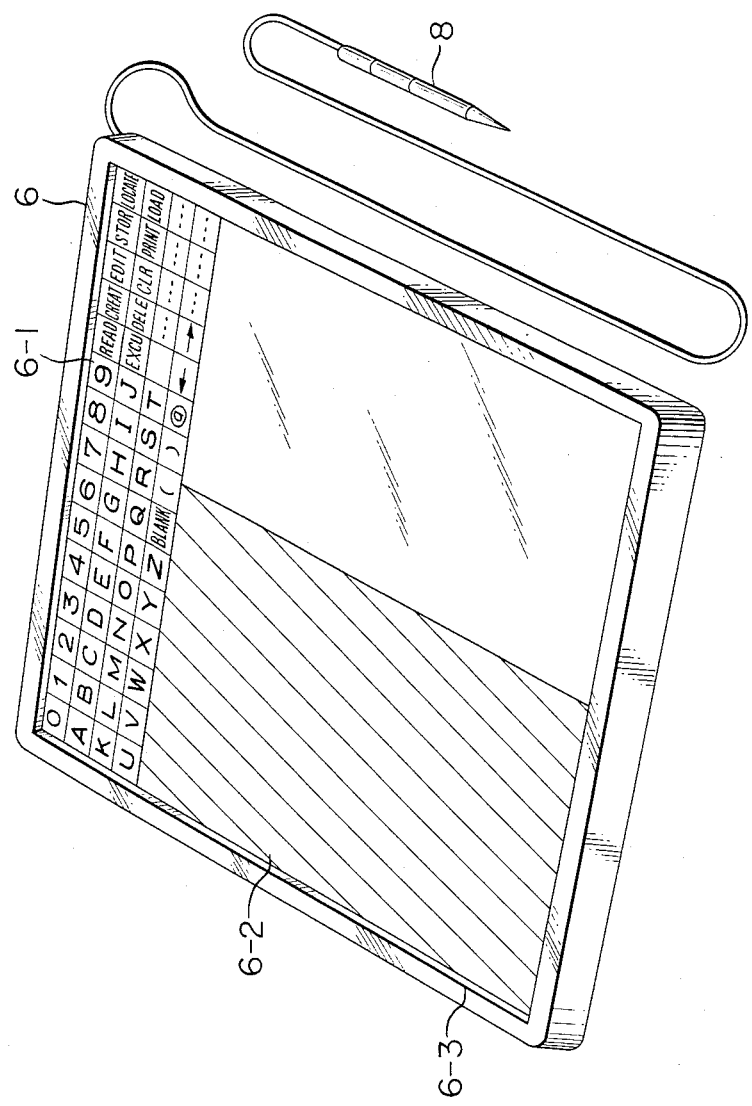
FIG. 3 is a perspective view of the digitizer in the embodiment.

FIG. 3 is a detailed view of the digitizer 6.

In FIG. 3, the main body is designated by 6. 8 is a stylus pen. When the operator points out a point on the digitizer 6 with the stylus pen 8, the coordinate data of the point are transmitted to the image processor 5 which discriminates the image processing data according to the coordinate data.

The area 6-1 of the digitizer 6 is an input part provided for input of alphabet, numerals and processing data of character column command group. The hatched area 6-2 is a paper placing area on which a document or a sheet of recording material is placed. The size of the area 6-2 corresponds to that of a selected format, for example, A4 format. The sheet of paper is placed in alignment with the position guide 6-3. By placing the paper sheet on the area 6-2 in this manner, there is obtained a one-to-one relation between the area 6-2 and the image data stored in the buffer memory 2. For instance, when it is wished to extract a part of the document image stored in the buffer memory 2, it is realized by placing the document on the digitizer 6 and actually indicating the desired part on the document with the stylus pen 8. Therefore, a printing operation on a recording paper of A4 format subsequent to it produces a copy which is blank excepting the extracting part.

As shown in FIG. 3, the input part 6-1 has a group of numerals, a group of alphabetical characters and a group of character column commands arranged in sections. For example, input of the character "D" is effected by pointing out the section of "D" on the input part 6-1 with the stylus pen 8.

While a digitizer has been particularly shown in the embodiment, it is to be understood that another input device such as key input device such as a typewriter or ten keys also may be used.

In the image processing apparatus of the type described above, the operator makes the necessary processing data previously stored in the disk memory 4 as a program while taking with the area 7-3 of CRT 7 through the digitizer 6. The desired image processing is carried out in accordance with the stored processing data. CRT 7 is able to display the surface of A4 format of the digitizer 6. At command input it displays the command put in at that time, and at coordinate input, it makes an image display.

For the purpose of this specification the program of command group (examples thereof are shown in FIG. 10) is defined as "application file (command file)". The image processing part 5 is able to store a plural number of such application files in the disk. To every application file is put a file name named in two different manners, namely, in two-digit number or six-alphabetical character symbol and in a combination of numeral and blank. The name put to the application file is hereinafter referred to as "command file number (CF No.)".

Also, for the purpose of this specification, the image data transferred to the disk memory 4 from the buffer memory 2 and registered in the disk memory is defined as "image file". A plural number of such image files are stored in the disk memory 4 and therefore a plural number of document images can be registered in the disk memory. Again, to every image file is put a file name named in the same manner as above, namely, in two-digit number or six-alphabetical character letter symbol and in a combination of numeral and blank. For these two different kinds of files, the operator can give to the apparatus an instruction to indicate whether the file now being registered can be cancelled or not. Such instruction is registered, for example, in the column of status 2 shown in FIG. 8.

Before image processing, such image file and command file are previously registered in the manner described above. FIG. 4 shows an example of image processing procedure using such image file and command file registered.

A first sheet document as shown in FIG. 4(A) is read by the reader part 1 and then the image data are stored in the buffer memory 2. In the shown example, it is wished to extract a portion $n_1$ from the stored image data. To this end, the operator points out two points A and B on the document by the digitizer 6 to define the desired portion $n_1$. The extracted image data of $n_1$ is registered in the disk memory 4 with an image file name of "01". Subsequent to it, a second sheet document as shown in FIG. 4(B) is read by the reader part 1 and the image data are stored in the buffer memory 2. Similarly to the above, the operator points out points C and D by the digitizer to extract a desired portion $n_2$ from the stored image data. The extracted image data are then registered in the disk memory 4 with a file name of "02". Thereafter, an image file having a file name of "03" is transferred to the buffer memory 2 from the disk memory 4. (In the shown example of image processing, the image file with a file name of "03" is of blank image. By transferring this image file to the buffer memory 2 the latter becomes all cleared.) As shown in FIG. 4(C), by pointing out the point E the image file of file name "01" is transferred to the area $m_1$ of the buffer memory 2 and registered there. Similarly, by pointing out F, the image file of "02" is transferred to the area $m_2$ of the buffer memory 2 and registered there. As a result of it, within the buffer memory 2 there is now formed one page of image data containing the image data $n_1$ and $n_2$ arranged in the manner shown in FIG. 4(C). By putting out all of the content of the buffer memory 2 into the printer part 3 a desired number of records can be obtained. For example, the printer 3 can record the desired image data on five sheets of recording material repeatedly.

In the above example, an image processing has been executed by a selection instruction of one application file. However, the same image processing can be executed by plural instructions while giving commands to the apparatus one by one.

When the image processing apparatus is to be started driving with the selection of one set of processing data (application file) registered in the disk memory 4 as in the case of the above example, the input of the driving start instruction (EXCU) can be made from the operation part 13 provided on the image processing unit 10 shown in FIG. 2 or by use of the digitizer 6 of the data forming unit 11. The application file used in the above is equivalent to the execution command file later described.

Figure 5A:
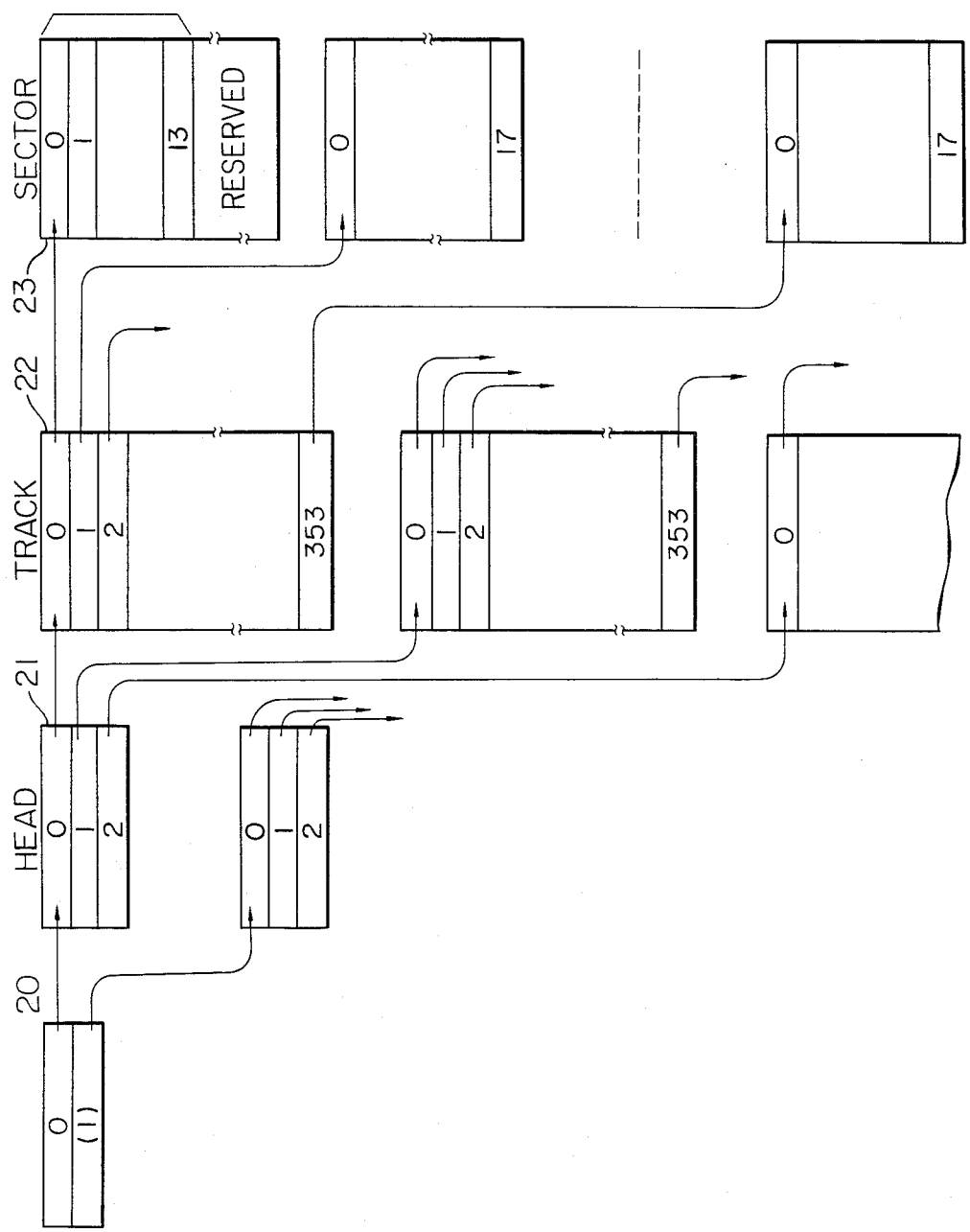
FIG. 5(A) is an exemplary view showing the arrangement of addresses in a disk.

FIG. 5A illustrates the physical address arrangement of the disk memory 4 used in the above example.

In the above example, there has been used a disk unit of Model No. WDS 10 having a mounted-in iMi 7110 fixed disk drive made by SORD Company. FIG. 5(C) shows the disk surface.

In FIG. 5A reference numeral 20 depicts a disk drive which is usually single. 21 is a head for reading the disk. The number of heads usually provided for one drive is 0 to 2. One head has three hundred fifty-four (354) cylinders, that is, tracks 22. To each cylinder there are provided eighteen (18) sectors 23. These constitute a disk memory. Each sector includes 512 byte data blocks. The outer-most circumferential sector is used to store index data concerning which sector is vacant, excepting itself, and what data are stored in the respective sectors, excepting itself. Therefore, data reading begins with this index data.

However, this disk system has some limitations of access because of the limitation of its physical structure. Generally, continuous access should be executed while changing the address on the disk in accordance with a determined sequence. FIG. 5(B) is a table showing the cylinder/head sequence determined for this purpose. The numbers shown in the table are sequence numbers. According to the table, when a sequence number is determined, the cylinder/head address corresponding to the sequence number is automatically determined. The address to which the next access is to be made is the cylinder/head address given by the sequence number determined by the present sequence number plus 1 (+1). As readily understood from the table, the quotient of the sequence number divided by 3 is the cylinder address and its reminder is the head address.

The sequence of access to the sector at the time when the addresses of head and cylinder have just been determined is in order of sector number from low to high.

The number of drives corresponds to that of the disk units then used. In this example, it is only one and therefore only drive "0" is used.

Figure 6:
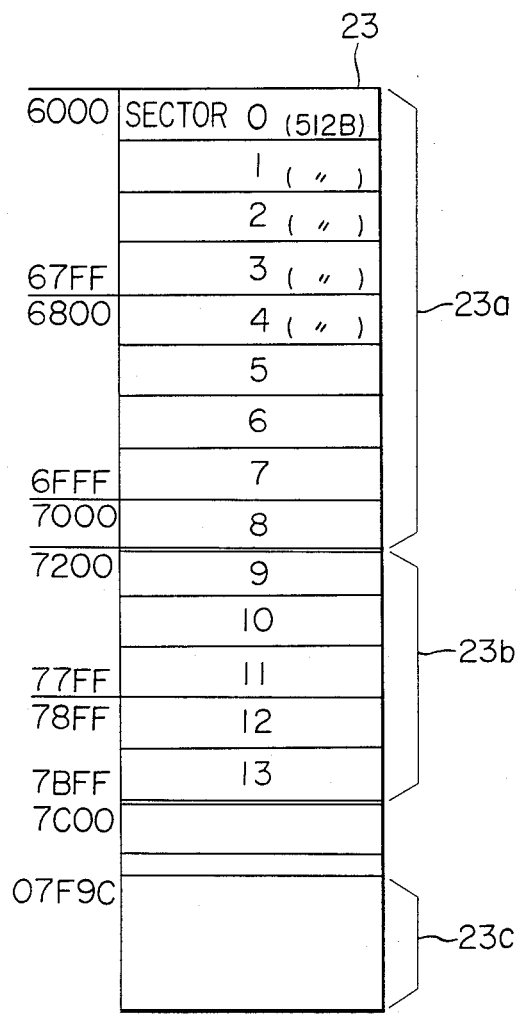
FIG. 6 illustrates the content of sector.

As previously mentioned, an index table is provided in a fixed area of the disk to control the using state of the disk. FIG. 6 shows the allocation for use in the index table.

Figure 7:
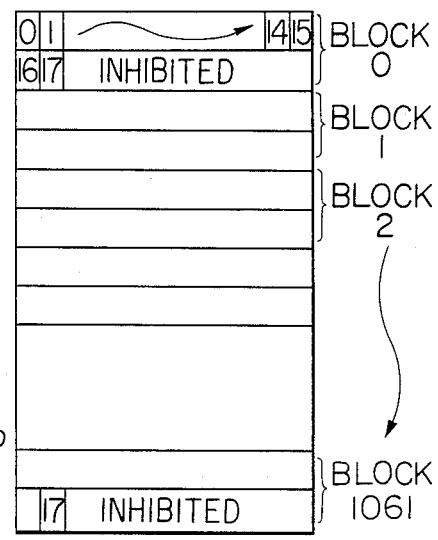
FIG. 7 illustrates the content of sector bit map table.
Figures 8, 9:
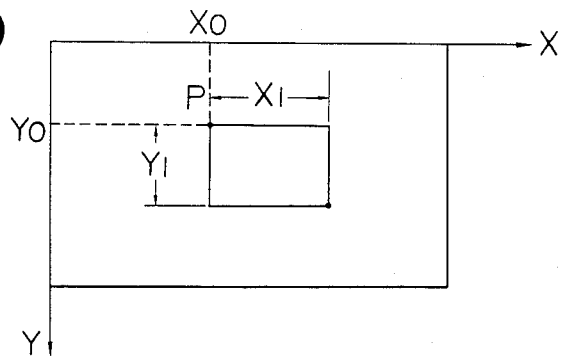
FIG. 8 illustrates the coordinate of fill index.
FIG. 9 illustrates the coordinate of image file.

In the shown example, sectors 0 to 13 of head "0", cylinder "0" have been allocated to the index part. Of these sectors nine sectors 0 to 8 are used as a sector bit map table 23a as shown in FIG. 7 and the remainder 23b is used as a file control index part as shown in FIG. 8. 23c is a command table area in which command data are stored. Although the position of the sectors of this area is optional, their addresses on RAM correspond to those from 7F9C. Data of these sectors 0 to 13 are fixedly developed in RAM from 6000-th address to 7BFF at the execution of the open program by CPU 5. After some necessary operations, the data are described in the disk memory by the close program. The term "open" as herein used means read-in of the file index formed on the determined fixed area of the disk and the table informing of the using state of the disk into RAM area (fixed). The term "close" means registration of RAM area (fixed) in the disk. Both the opening and closing are made of micro program instructions by CPU5.

In this connection, it should be noted that when any access to file (image or command) is to be executed, an open processing is required to transfer the content of the disk memory to the system memory RAM 2 at addresses from 6000 thereby obtaining data of the file (data of type, size, disk physical address etc.). Also, at the data change it is necessary to carry out open and close processings.

The sector bit map table for informing of the using state of every sector will be described hereinafter with reference to FIG. 7.

As shown in FIG. 7, on the bit map, every sector and every state thereof correspond to each other (in use=1, not in use=0). Block number is the sequence number previously described. To every sequence number there are allotted four (4) bytes (32 bits) and seventeen (17) sectors of amount of bit, that is, 17 bits correspond to the sectors respectively (bits from 18th bit on are inhibited).

The bit map table is operated in accordance with a program for finding out the disk area where a requested number of sectors can be continuously used so that the sequence number and the sector number corresonding to the usable disk area may be obtained from the map. Also, in accordance with a program for mark/clear of the corresponding bit on the map, any requested bit can be marked/cleared.

In this manner, a certain fixed area of the disk is used as a memory area only for keeping the using state of the disk in memory. Its every one bit is allotted to every one sector. When the bit is ON, it is regarded to be in use. Further, bits are made to correspond to sectors in such sequence in which a continuous access is possible and searching time is minimum. When a new data file is to be registered in the disk, the area where the necessary number of continuous sectors are vacant is searched for. When such area has been found out, the corresponding bits are turned ON. On the contrary, when a data file is cancelled, the bits of the corresponding area are turned OFF.

In this connection it should be noted that those bits corresponding to its own sector bit map table (FIG. 7) and to the file index table (FIG. 8) on the bit map must be marked as being in use previously at the time of disk initialization.

The file index will be described hereinafter with reference to FIG. 8.

The first eight bytes (to the fourth item) of the table shown in FIG. 8 are used to keep in memory the overall state of using of the file index table. This part of the table is made up at the time of disk initialization. The area of Status 1 is area for expansion and has not yet been used at that time.

MAX block is the number of registrable image and command files which is 50 in the shown embodiment. The next item, 1 Block Size is length of file index per file which is 38 bits in the shown embodiment. Current B No. is the number of the files currently registered. When a new file is registered, the number stored in this block is compared wtih MAX size. Only when the former is smaller than the latter, the number in Current B No. is increased up by +1. When one of the registered files is cancelled, the number is reduced by 1.

The ninth byte and the follwing bytes form file index blocks in practice with each one block containing 38 bytes. The contents stored in these blocks are as follows:

RSV is for system expansion. File No. is a block for keeping in memory the file number by which one file is discriminated from others. Numerals from 1 to 99 are used for file number.

There are three different file types, 0, 1 and 2. "0" is image data file, "1" is program code data file and "2" is execution command file (later described). The next 6-byte Bank and Address are address data significant only for the file types "1" and "2". The data are used when such type of file is allocated (load) to a determined address on the system memory. Byte Count is data length of the file.

Blocks from Sector Count to Status are used for storing data of hard address on the disk at which the file is stored. As previously described, sequence No. etc. are stored there by the bit map. Blocks from $X_0$ to $Y_1$ are significant only for files of type 0. Data of coordinate are stored in these blocks in mm as physical unit. The coordinate data contain information of the positions on a two-dimensional coordinate system at which the image data must be developed. FIG. 9 illustrates an example of development on the image data on a two-dimensional coordinate system. Their file indices are formed by parameters as given by CREAT command at registration of file. For a file of type "0", that is, an image file, the necessary parameters are file number, type name, $X_0$, $Y_0$, $X_1$ and $Y_1$. For file types "1" and "2", namely for command file, the necessary parameters are bank, address and byte count. Some parameters can not be applied by the operator's input operation. An example of such parameter is disk hard address parameter. Such parameters are automatically given by various programs and then stored in the memory.

In the above, the manner of registration of file has been described. Now, the procedure in practice of input-output of image data between disk and image memory RAM will be described by way of example.

As an example, description is made of the case where data of an appointed file number are developed into the image memory RAM from the disk.

At first, the index part is searched for in RAM by "open" processing to get the index block corresponding to the desired image file number (file No.). From data of $X_0$, $X_1$, $Y_0$, $Y_1$ stored in the block the address of image data on the image memory is obtained by calculation and then DMA transfer starts to transfer the image data from the real disk to the image memory.

It is notable herein that the development of the image data on a two-dimensional coordinate system can be determined by only two parameters of $X_0$ and $Y_0$. Therefore, when this coordinate of development is wished to change, it can be attained by changing the position of only the index data by position change instruction (Locate Command) and designating $X_0$ and $Y_0$. This is very favourable to the operational function of this system. As previously described, $X_0$ and $Y_0$ are obtained by pointing out two points on the digitizer.

Execution commands used in image processing according to the invention are as follows:

(1) "DUMP" command for dumping the content of memory (output to typewriter, CRT);

(2) "CHANGE" command for making reference and changing the memory content for purpose of system check;

(3) "TPLD" command for loading paper tape for purpose of system control;

(4) "iDISK" command for initializing the whole area of the disk (index clear);

(5) "CREAT" command for registering file together with coordinate data;

(6) "DELT" command for cancelling file;

(7) "DiRX" command for putting out the file register list the translation of which is displayed on CRT 7 or other display;

(8) "LOAD" command for reading file data into RAM;

(9) "STOR" command for registering the file data in disk;

(10) "LOCATE" command for changing the coordinate parameter to the given file;

(11) "DITH" command for transmitting a control command to a dither controller for half tone reproduction;

(12) "READ" command for reading document by CCD and storing the image data in RAM;

(13) "PRINT" command for putting out the content of RAM into the printer for copying operation;

(14) "EDIT" command for edition and registration of execution control commands;

(15) "EXEC" command for print execution by registered command;

(16) "INPUT" "OUTPUT" command for system checking; and

(17) "KILL" command for stopping the console control task of the unit 11 thereby allowing operation of the printer unit 10 by console 13.

Printing can be executed by either of console input to units 10, 11 and "EXEC" command.

Each of the commands listed above executes such one type of processing. However, in practice, an image processing task as a whole can be attained by a combination of above various commands and execution of the command combination. Based on the realization, the image processing system of the present invention uses such a combination of commands (command group). Such command groups are previously registered in the disk together with their names. Thus, one command group is stored as one file with its own file name (file No.). Whenever necessary, any one of the registered command groups is read out from the memory to use it for a desired image processing job. A process of registration of execution of such a command group will be described hereinunder for the purpose of illustration.

Figure 11A:
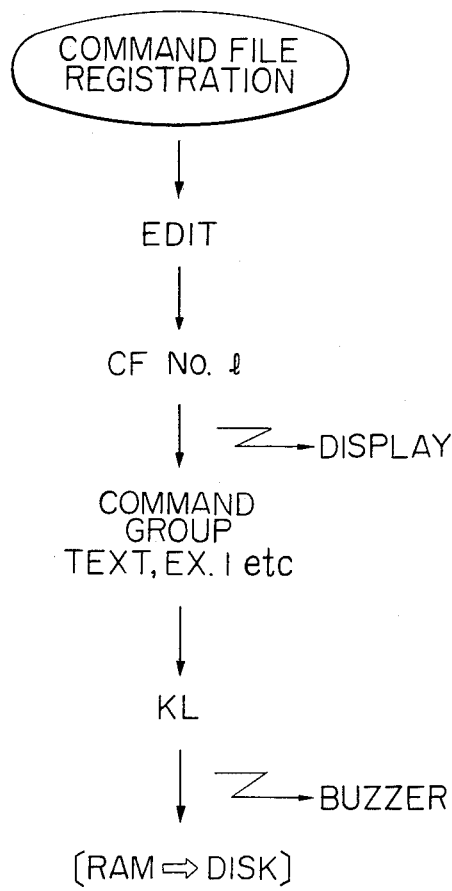

A series of commands (one command group) are serially put into the apparatus by "EDIT" command and stored in RAM 2 at addresses from 7F9C of text buffer. Also, its command file number is put in to make the command file correspond to index. By input of "KL" CR the data (512 bytes) are transferred immediately to the disk 4 and registered there. FIG. 11(A) is a flow chart showing this process.

Figure 11B:
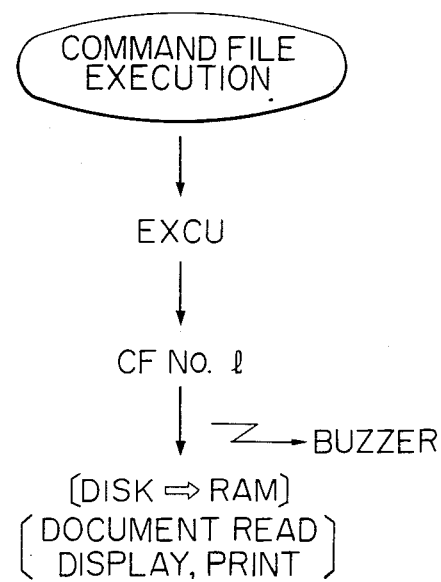

To execute the command file, the file is called up by "EXEC" command. Thus, the file is called in the text buffer at addresses from 7F9C from the disk memory 4. Then, the command file is delivered to the command control task together with address pointer indicating the start of command execution. By input of the command file No. after "EXEC" command, all the necessary image processing operations are sequentially performed in accordance with the commands in the command file. FIG. 11(B) is a flow chart showing this command file execution process.

Four examples of such command file, Examples 1, 2, 3 and 4 are shown in FIGS. 10(A), 10(B), 10(C) and 10(D) respectively.

Figure 10A:
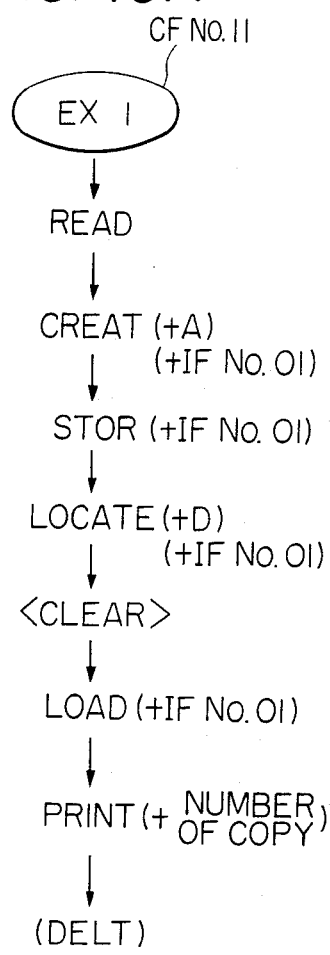
FIGS. 10(A) to 10(D) and FIGS. 11(A) and 11(B) are flow charts showing examples of command input.

File No. 11 shown in FIG. 10(A) is a command file for printing out a desired part of a document on a desired part of a paper sheet. By input of "READ", CCD read command is applied. Input of "CREAT", coordinate designation of two points (A, B) and input of image file number command to extract the area defined by A and B. The order of input of "READ" and "CREAT" is reversible. By "STOR" the extracted image is DMA transferred to the disk. By "LOCATE" input, designation of the position for development of point P and input of IF number a new place for the extracted image is located to which the extracted image is to be displaced and at which it is to be developed in RAM. By input of Clear, RAM data other than the data in the development area are cleared off like the case of above described image file number "03". By the next command "LOAD", the image is DMA transferred to RAM at the located new place from the disk. Input of "PRINT" and input of number of copy command the printer to make the requested number of copies of RAM image. "DELT" becomes unnecessary if the image is to be permanently stored in the disk as in the case of format or the like. However, if it is a temporary image, then the execution of "DELT" is necessary for preventing any inconvenience to the next filing. Input of file number and number of copies to be made can be carried out also by the digitizer.

The individual tasks such as document read and print may be done at every input of the corresponding commands. However, by previously putting "EDIT" in the apparatus, a series of commands are registered in the disk all together as a command group of File No. 11 in the manner described above. Therefore, in this case, document read and print can be executed by input of "EXCU" only. FIGS. 11(A) and 11(B) show examples of such procedure. With input of "EDIT" and input of command file number, CRT 7 displays them. Input commands are sequentially displayed on CRT 7 and stored in RAM. On the input of "KL", the command file is transferred to the disk with buzzer. "EXCU" input and command file input make the buzzer On and also make the command file transferred from disk to RAM to execute the operations of document read, image extraction and print.

Figure 10B:
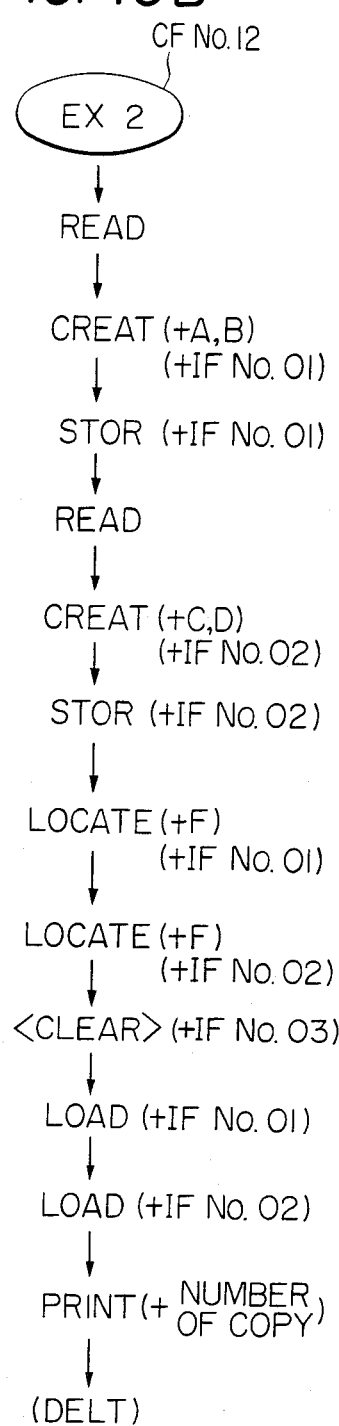

Ex. 2 in FIG. 10(B) is an example of command file for printing out two different partial images on one and the same sheet of paper while arranging the two partial images as shown in FIG. 4.

Figure 10C:
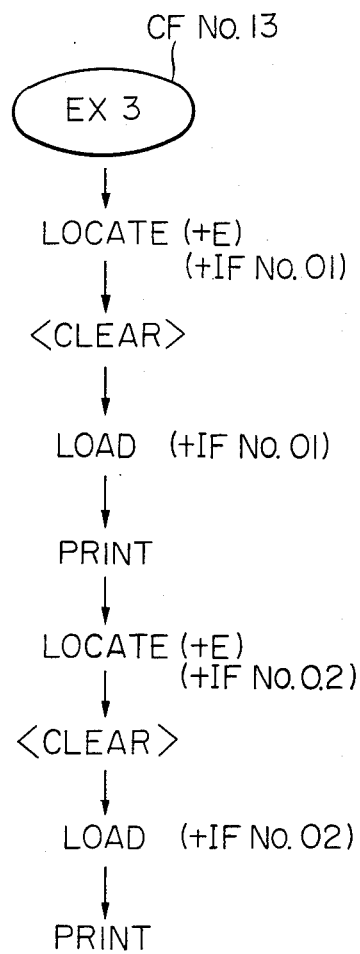

Ex. 3 in FIG. 10(C) is an example of command file useful for printing out two different image files No. 01 and No. 02 already registered in the disk on two different paper sheets, but at the same position (point E in FIG. 4(C)) serially.

To make the command file, "LOCATE" input, coordinate input and input of IF number are carried out at first. Next, input of "CLEAR" is carried out and then "LOAD" input and "PRINT" input are serially carried out. Thereafter, the above inputs are repeated with only a change of IF number. This example is advantageous for printing out different images on many letter size papers repeatedly. As the different images are serially put out in a position (point E) suitable for letter size paper, printing of the different images can be performed repeatedly on many letter size papers by an input of "EXCU" only. Therefore, electronic sorting of partial images is possible for any sizes of paper sheet.

Figure 10D:
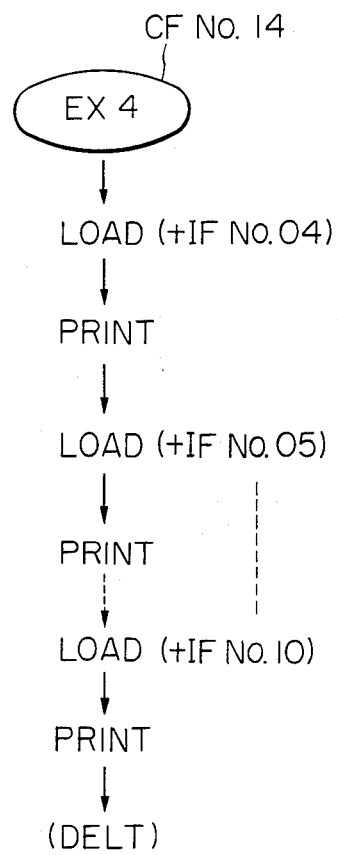

Ex. 4 in FIG. 10(D) is an example of a command file for printing out many different document images 4–10 on different sheets serially. The document images Nos. 4–10 have previously been registered in the disk by "READ" and "STOR".

Other various image processings are possible using many other combinations of commands in the light of above teachings. For example, it is possible to print out a document image while interchanging partial images between particularly selected different partial images of the document image without clearing any other parts. Also, it is possible to print out a format image while inserting a portion of a document image into the vacant part of the format image. All of these printings can be carried out continuously and automatically.

Figures 1, 1A, 1B, 12:
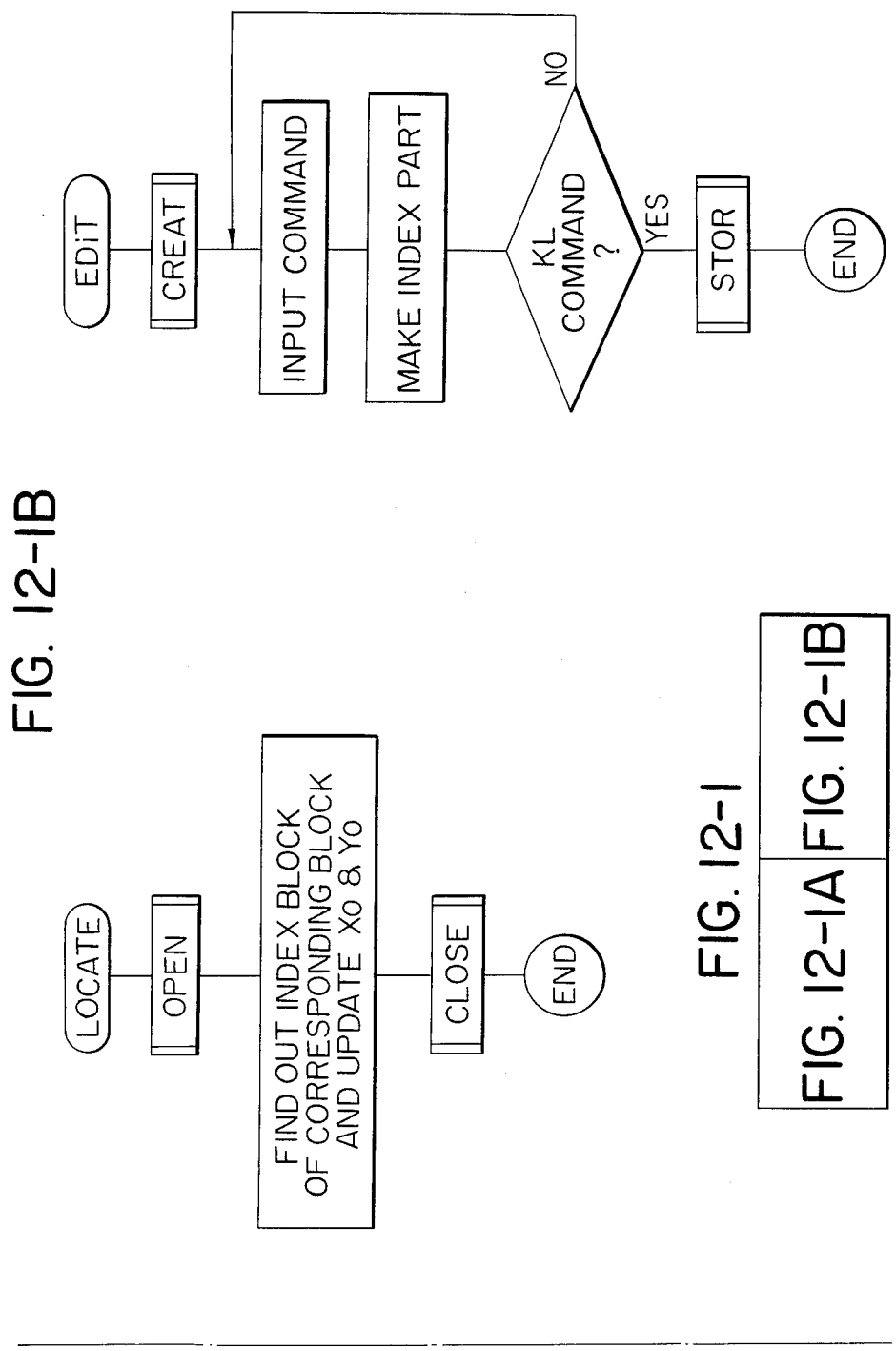
FIG. 12, consisting of FIGS. 12-1, 12-1A, 12-1B and 12-2, shows the detailed control flow charts of the respective commands.
Figures 2, 12:
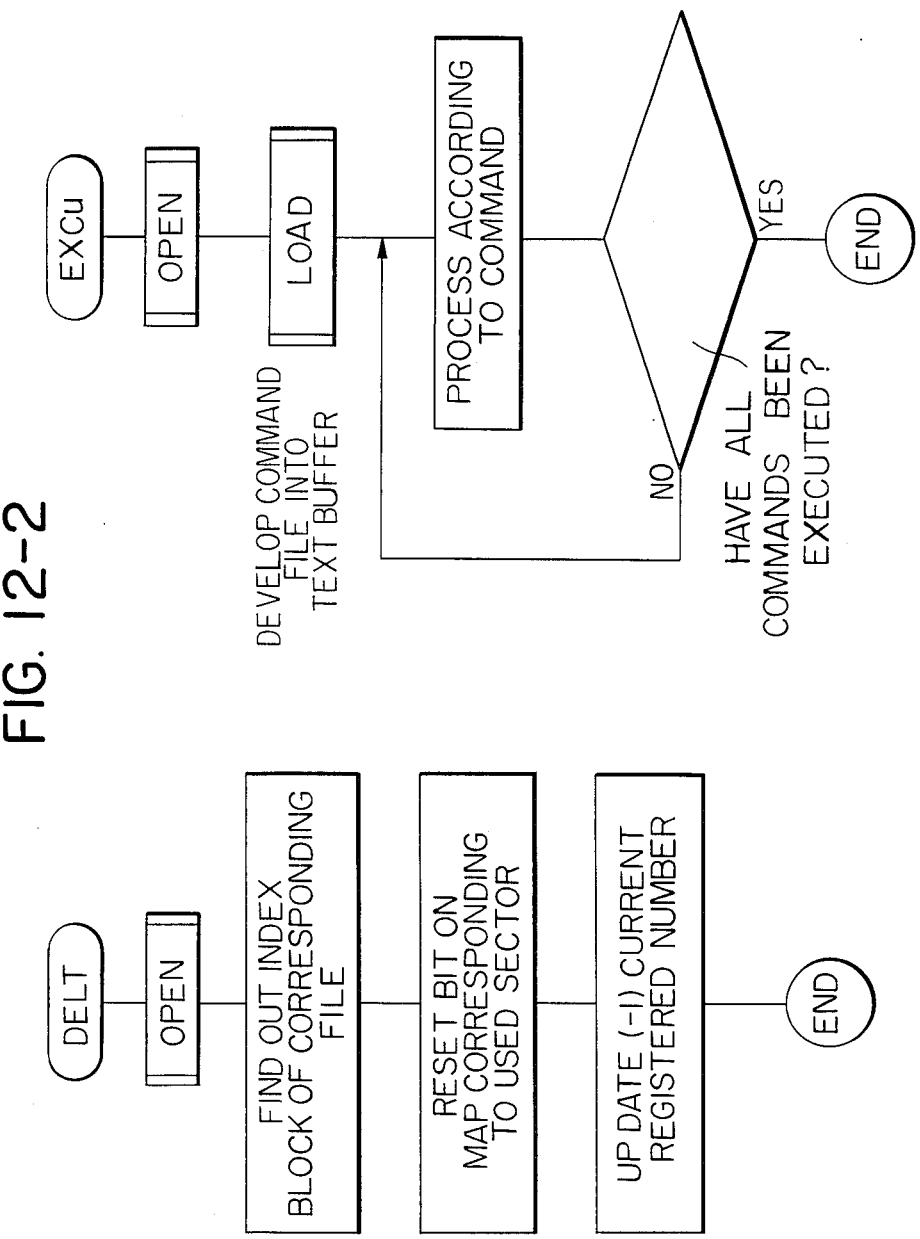
FIG. 2 is a perspective view thereof showing the external appearance of the apparatus.

The procedure of control of above every command by CPU 5 is shown in detail in FIG. 12 as control flow charts. These flow charts are self-explanatory and need not be further described. LOAD/STOR controls the data transfer between disk and RAM by DMA. The DMA transfer is executed by DMA parameters obtained from the items up to STATUS of File Type (0) in the index table shown in FIG. 8.

Figure 13:
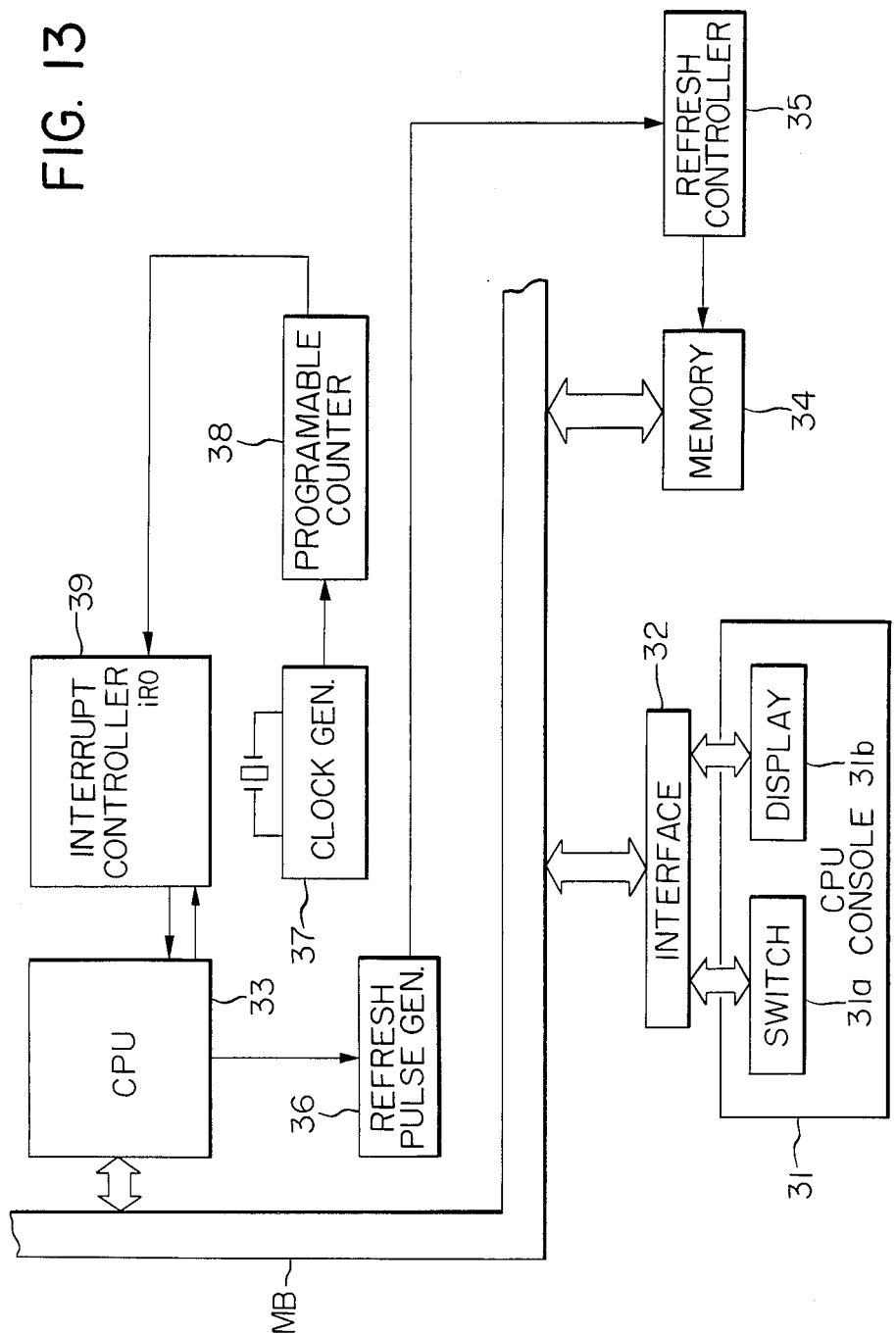
FIG. 13 is a block diagram showing another embodiment of the invention.

FIG. 13 shows another embodiment of the apparatus according to the invention.

Designated by 31 is a CPU console in the shape of a panel on which a group of switches 31a and a display unit 31b composed of, for example, LED's are arranged. The switch group 31a is, for example, a key switch group or plug-in switch group. The switch group is composed of about twenty switches (corresponding to 20 bits). The function of these switches is to allocate addresses of, for example, a memory the content of which is to be displayed. Data obtained by this switch operation are applied to a multi-bus MB through an interface 32. Connected to the multi-bus MB are CPU 33, memory 34, etc. In a conventional method it processes data from memory or input unit and executes determined commands. The memory 34 is, for example, a dynamic RAM able to store image data. The content of the memory is refreshed by refresh pulses obtained from a refresh pulse generator 36 through a refresh controller 35. Like the embodiment shown in FIG. 1, Model No. 8086 by Intel Company may be used as CPU 33 and 8255A as the interface 32. 39 may be 8259A and 38 may be 8253 by the same company. The embodiment shown in FIG. 13 can execute the same image processings as the embodiment shown in FIG. 1 can. The memory 34 corresponds to RAM in FIG. 1.

Figure 15A:
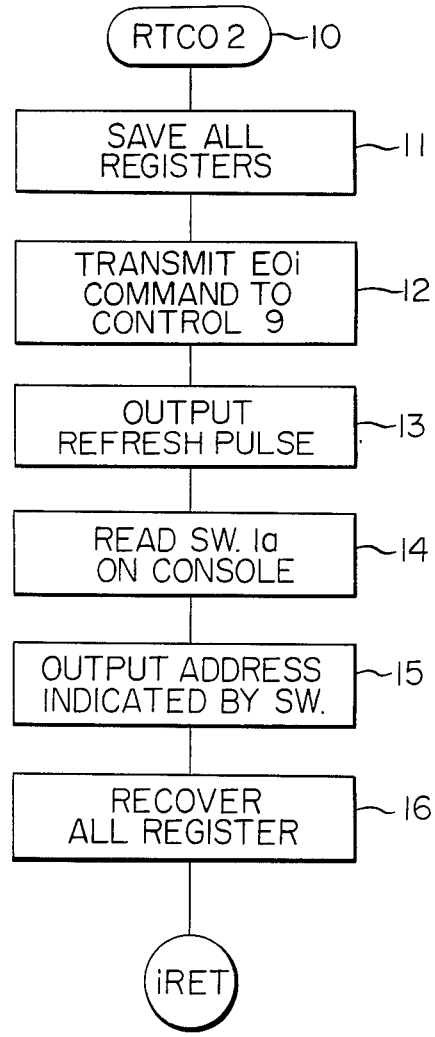
FIGS. 15(A) and 15(B) are flow charts showing the flow of control.
Figure 15B:
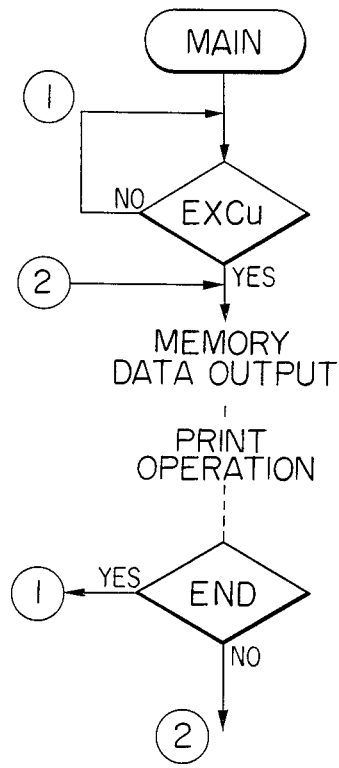
Figure 14:
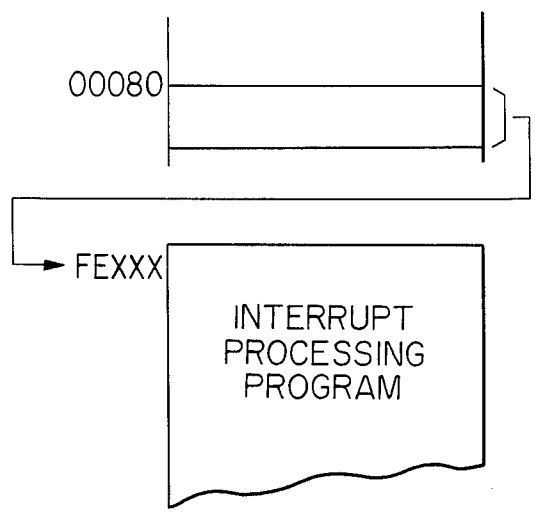
FIG. 14 illustrates the content of a certain selected address in the memory.

Designated by 37 is a clock generator formed of a quartz of 22. 1184 MHz from which 153.6 KHz can be obtained by frequency dividing. This signal is frequency divided into 1/308 through a programmable counter (interval timer) 38 and then it is transformed into a square wave of 2 ms. This signal is connected to the highest priority level terminal iR0 of an interrupt controller 39. By the rising edge of this signal, an interrupt is applied to CPU 33 for 2 ms. When such interrupt occurs, the interrupt controller 39 requests CPU 33 for interrupt. When the request is accepted, the program start address (for example FEXXX) stored from 80th address of the memory 34 is read out. This start address in the memory is illustrated in FIG. 14. Thus, CPU starts to carry out the following processing the steps of which are shown in FIG. 15:

When CPU recognizes the interruption, an interruption permitting flip-flop is reset in a form of hard so that all of flag (FLG), iP, cs resistors are saved into the stack area by firm ware (10).

At step 11, at first, all the contents of the registers are saved excepting stack pointer register sp, instruction pointer register iP, code segment register CS and flagresister FLG for storing the status of CPU. They are saved into the stack area pointed out by sp for returnback to the process before program interruption. The registers iP and CS are each a 16-bit register and form together 20-bit program execution address by composition. CPU recognizes it.

At step 12, OUT command is executed on the control register in the controller 39 to take out EOi command. By this command, the corresponding bit of register isR is reset to make it prepared for the next interrupt. The register isR is a register for keeping in memory the occurrence of an interrupt in the interrupt controller.

At the next step 13, refresh pulse is issued out from 36 to refresh the dynamic RAM 34 used in the system. Since the refreshing of the memory 34 is carried out depending on the system CPU 33 in this manner, the refreshing follows the operation of CPU 33. This has the merit that the memory 34 is never refreshed in the course of storing an image in the memory and therefore the state of an image stored in the memory 34 is never adversely affected by refresh.

At step 14, reading of the state of switch 31a on CPU console 31 is carried out and the state is read in an accumulator register AX within CPU in accordance to an iN (input) instruction to the address allotted to the switch.

At step 15, the data content obtained at step 41 is treated as an address. The memory content indicated by the address or the state of i/o is introduced into the display unit on the CPU console 31 to display it. This output is executed by an output instruction to i/o address of the display unit. For this display, for example, one bit data is allotted to one LED with 16 (sixteen) bits corresponding to 16 LED in total.

At the last step 16, all of the registers are recovered and the processing is returned to the step provisionally stopped by the above interrupt.

To make it possible to monitor the above process of interrupt program at any desired time, a particular monitor select switch is provided on the console 1. Reading the state of the switch, steps from step 14 are executed only when the switch is On. When it is Off, jump to step 16 is allowed.

The above procedure of steps 11 to 16 is repeated every 2 ms. Therefore, the display is renewed at the same frequency.

In the above embodiment, as the processor and the instruments around it there has been used SBC 86/12 board by Intel Company and the board has been connected to CPU console 31 through multi-bus MB.

Also, in the above embodiment, the content of memory has been displayed. However, if there is used a memory mapped i/o (input/output), then the status of i/o also can be displayed. For example, by selecting the i/o address allotted to the nearby switch one can monitor the content of the address, that is, the state of On-Off of the switch.

It is also to be understood that display can be made in a different manner from that shown in the above embodiment. In the above embodiment, one LED has been allotted to one bit data. But, there may be used a decoder so as to make a display using four digits of 7-segment elements as an example. If a part of the memory 4 is used as counter, this display method becomes particularly advantageous because the content of the counter can be displayed very easily.

As readily understood from the foregoing, the above shown embodiments of the present invention have many advantages.

According to the embodiments it is possible to continuously make a reference to the content of any desired memory address or i/o address while keeping the system in operation for ordinary processing. For example, the operator can monitor instantaneously changes of values of counter, flags, etc. allocated on RAM by program. By setting the running level of interrupt service routine (interrupt priority level) to the highest among the system, in this case, the routine is protected against any effect of such error occurring in any other processing routine which may bring the system into a hung-up state. Therefore, this provides an effective means for analyzing the error.

When very complicated processing has to be attained effectively, as generally admitted in the art, the most rational way is to combine simple processing function modules into a final process of high degree and suitable for the respective needs.

The combination of commands used in the invention is based on the above realization. The commands relating to document read, image processing and print in the above embodiment each have only a single function, which eliminates the complicatedness of program processing. On the other side, the combination of these individual commands enables to realize the aimed processing in the most suitable processing form for every operator's demand.

While the above embodiment has been shown and described as using the sector as the unit of control and processing, the sector may be further divided. Such a sector is the minimum unit accessible by means of hardware. However, if desired, the sector may be divided further into plural record units accessible by means of software.

According to the above embodiments of the invention it is also possible to search unused continuous area usable for any length of requested data and to locate the corresponding address on the disk. On the contrary, it is also possible to cancel any designated file. Thus, the present invention has a remarkable effect to improve the processing efficiency in processing of such data as image data which are variable in data length and have to be continuously put in and put out in a large quantity and in an access time as short as possible.

Further, according to the above embodiment, index data for file control are stored in a certain fixed area of a disk and there is provided means for referring to and updating of the coordinate data registered in the index table of the corresponding image file. This also has an effect to further improve the efficiency of operation in image processing.

What I claim is:

1. A copying machine having an image processing apparatus comprising:
   memory means in which data representing a plurality of images are stored;
   reading means for reading out said data stored in said memory means, wherein said read out data represents a plurality of desired images from among said plurality of images;
   image forming means for forming said plurality of desired images represented by said data read out by said reading means on different recording materials; and
   register means for registering signals representing operating steps of said reading means and said image forming means.

2. A copying machine according to claim 1, further comprising enabling means for enabling performance of said operating steps, represented by said signals registered by said register means.

3. A copying machine according to claim 1, wherein said image forming means forms each of said plurality of desired images at a predetermined position on different ones of said recording materials.

4. A copying machine according to claim 3, wherein said image forming means forms each of said plurality of desired images at the same position on different ones of said recording materials.

5. A copying machine according to claim 3, wherein said image forming means forms each of said plurality of desired images at a predetermined different position on different ones of said recording materials.

6. A copying machine according to claim 1, wherein said reading means reads out data representing a plurality of partial images.

7. A copying machine according to claim 6, wherein said memory means stores data representing said plurality of partial images.

8. A copying machine according to claim 6, further comprising means for reading an original and designating means for designating a trimming area of said original, wherein said memory means stores data corresponding to an image corresponding to said trimming area.

9. A copying machine having an image processing apparatus comprising:
   memory means in which data representing a plurality of images are stored;
   reading means for reading out said data stored in said memory means, wherein said data represents a plurality of desired images from among said images; and
   image forming means for forming said plurality of desired images represented by said data read out by said reading means at predetermined positions on different recording materials.

10. A copying machine according to claim 9, wherein said image forming means forms each of said plurality of desired images at the same position on different ones of said recording materials.

11. A copying machine according to claim 9, wherein said image forming means forms each of said plurality of desired images at a predetermined different position on different ones of said recording materials.

12. A copying machine according to claim 9, wherein said image forming means forms said plurality of said images in a predetermined order.

13. A copying machine having an image processing apparatus comprising:

memory means in which data representing a plurality of images are stored;

reading means for reading out data stored in said memory means, wherein said read out data represents a plurality of desired partial images contained in said plurality of images; and image forming means for forming each of said plurality of partial images represented by said data read out by said reading means on different recording materials.

14. A copying machine according to claim 13, wherein said image forming means forms said plurality of partial images in a desired order.

15. A copying machine according to claim 13, wherein said memory means stores data representing said plurality of partial images.

16. A copying machine according to claim 15, further comprising means for reading an original and designating means for designating a trimming area of said original, wherein said memory means stores data representing said trimming area of said original.

* * * * *

UNITED STATES PATENT AND TRADEMARK OFFICE
CERTIFICATE OF CORRECTION

PATENT NO. : 4,760,608

DATED : July 26, 1988

INVENTOR(S) : AKIRA SUZUKI

It is certified that error appears in the above-identified patent and that said Letters Patent is hereby corrected as shown below: Title page:

AT [57] IN THE ABSTRACT

Line 3, "in set" should read --in a set--.

IN THE DRAWINGS

Sheet 11, Figure 12-1A, "REGISTERD" should read --REGISTERED--.
    Sheet 14, Figure 13, "PROGRAMABLE" should read --PROGRAMMABLE--.
    Sheet 15, Figure 15A,
  " RECOVER " should read -- RECOVER --.
  ALL REGISTER             ALL REGISTERS

COLUMN 2

Line 12, "keep" should read --keeping--.

COLUMN 3

Line 37, "exemplary" should read --explanatory--.
    Line 44, "coordinate of fill index;" should read --content of file index table;--.

COLUMN 4

Line 6, "buffer memory." should read --buffer memory 2.--.
    Line 62, "extracting" should read --extracted--.

UNITED STATES PATENT AND TRADEMARK OFFICE
CERTIFICATE OF CORRECTION

PATENT NO. : 4,760,608

DATED : July 26, 1988

INVENTOR(S) : AKIRA SUZUKI

It is certified that error appears in the above-identified patent and that said Letters Patent is hereby corrected as shown below:

COLUMN 5

Line 8, "taking with" should read --designating--.

COLUMN 6

Line 39, "outer-most" should read --outermost--.
    Line 60, "reminder" should read --remainder--.

COLUMN 7

Line 45, "corresonding" should read --corresponding--.

COLUMN 8

Line 9, "MAX block" should read --MAX Block--.
    Line 15, "wtih" should read --with--.
    Line 17, "up" should be deleted.
    Line 19, "follwing" should read --following--.

COLUMN 11

Line 35, "carried" should read --carried out--.
    Line 36, "above every" should read --every above--.

UNITED STATES PATENT AND TRADEMARK OFFICE
CERTIFICATE OF CORRECTION

PATENT NO. : 4,760,608
DATED : July 26, 1988
INVENTOR(S) : AKIRA SUZUKI

It is certified that error appears in the above-identified patent and that said Letters Patent is hereby corrected as shown below:

<u>COLUMN 13</u>

Line 6, "Intel Company" should read --the Intel Company--.
Line 18, "bit data" should read --bit of data--.
Line 51, "aimed" should read --desired--.

Signed and Sealed this

Eighth Day of August, 1989

*Attest:*

DONALD J. QUIGG

*Attesting Officer*       *Commissioner of Patents and Trademarks*